United States Patent
Fullhart

[11] 3,838,872
[45] Oct. 1, 1974

[54] HITCH MOUNTABLE TO A SHOCK ABSORBING BUMPER

[75] Inventor: Richard L. Fullhart, Elkhart, Ind.

[73] Assignee: Reese Products, Inc., Elkhart, Ind.

[22] Filed: Sept. 26, 1973

[21] Appl. No.: 401,045

[52] U.S. Cl. .................................................. 280/495
[51] Int. Cl. .................................................. B60d 7/00
[58] Field of Search ....... 280/495, 496, 482; 293/73

[56] References Cited
UNITED STATES PATENTS

| | | | |
|---|---|---|---|
| 2,554,711 | 5/1951 | Lowman | 280/495 |
| 2,569,086 | 9/1951 | Zenk | 280/495 |
| 3,463,513 | 8/1969 | Burton | 280/495 |
| 3,682,360 | 8/1972 | Fletcher | 293/73 |

Primary Examiner—Robert R. Song

[57] ABSTRACT

A hitch including a bar member which extends longitudinally of a towing vehicle. The hitch bar member has its rear end portion rigidly connected to the bumper of the towing vehicle and has its forward end portion guidably supported by a bracket attached to the frame of the towing vehicle whereby the bumper of the towing vehicle being of the shock absorbing type and experiencing shiftable movement relative to the vehicle causes the bar member of the hitch to shift relative to the vehicle frame. A hitch ball or similar coupling means is secured to the rear end portion of the bar member and is adapted to be connected to a towed vehicle.

5 Claims, 3 Drawing Figures

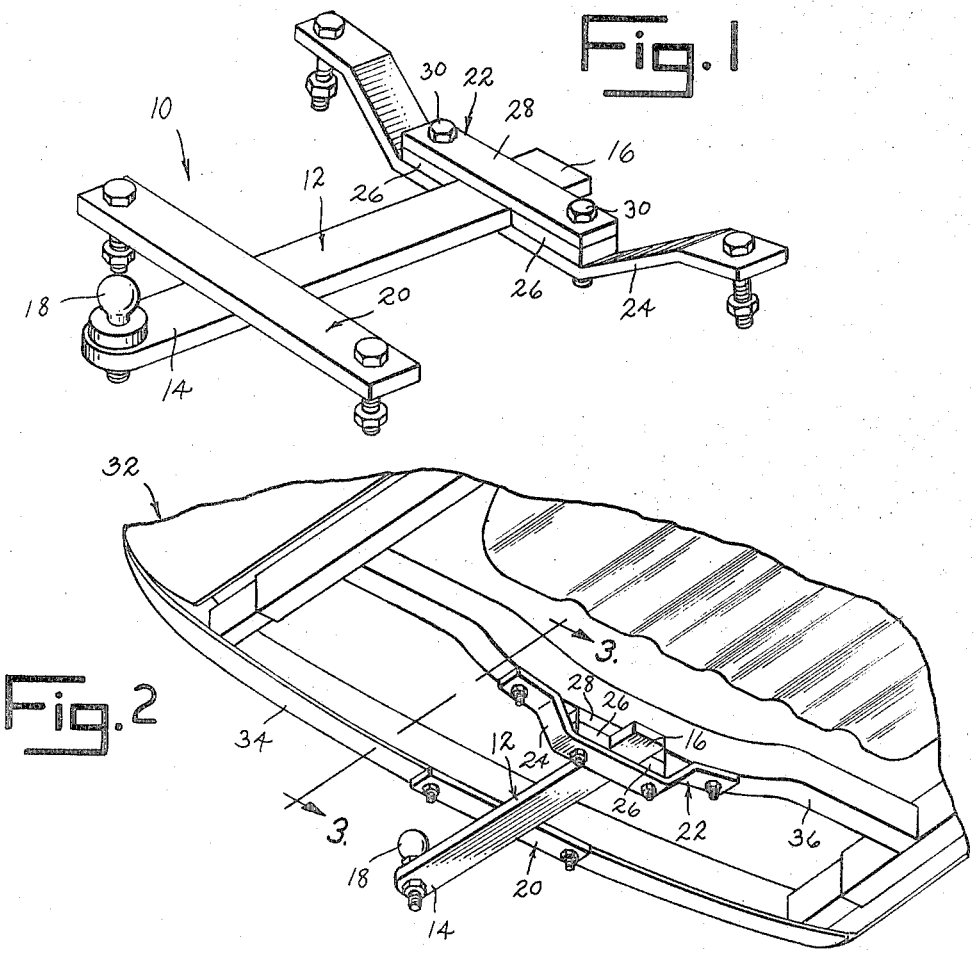
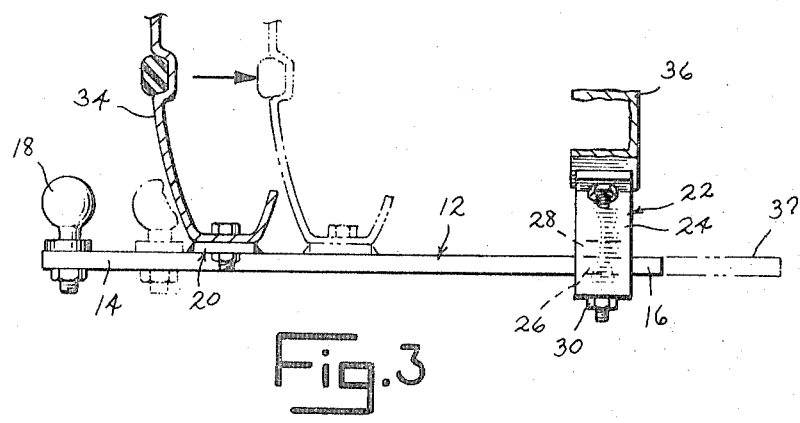

HITCH MOUNTABLE TO A SHOCK ABSORBING BUMPER

SUMMARY OF THE INVENTION

This invention relates to a bumper hitch and has particular application to a hitch which is mountable to a shock or energy absorbing bumper of a towing vehicle and which is shiftable with the bumper relative to the frame of the towing vehicle.

The hitch of this invention includes a rigid bar member which extends longitudinally of the towing vehicle and which has front and rear end portions. The rear end portion of the bar member carries means for releasably connecting a towed vehicle to the bar member. The bar member is rigidly secured to the shiftable shock absorbing bumper of the towing vehicle adjacent its rear end portion so that upon movement of the bumper relative to the vehicle the bar member will shift therewith. A support bracket is secured to the vehicle frame forwardly of the bumper thereof. The support bracket includes guide means which receive in sliding cooperation the forward end portion of the bar member and which serve to permit longitudinal movement of the bar member relative to the bracket upon shiftable movement of the vehicle bumper.

Accordingly, it is an object of this invention to provide a bumper hitch for a shock absorbing vehicle bumper.

Another object of this invention is to provide a hitch which is mountable to a shock absorbing bumper and which is of reliable operation.

Still another object of this invention is to provide a hitch which is mountable to a shock absorbing bumper and which is of economical construction.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the hitch shown detached from the towing vehicle.

FIG. 2 is a view of the hitch secured to the towing vehicle as seen from below.

FIG. 3 is a side view of the hitch shown secured to the towing vehicle with the bumper and hitch shown in an extended position in solid lines and a retracted or shock absorbing position in broken lines.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Hitch 10 includes a rigid bar member 12 having a rear end portion 14 and a front end portion 16. Rear end 14 of bar member 12 carries a hitch ball 18 or other suitable coupler means for a towed vehicle. A transverse attachment plate 20 is secured to bar member 12 adjacently forwardly of hitch ball 18. Hitch 10 includes an attachment bracket 22 which supports front end portion 16 of bar member 12. Attachment bracket 22 includes a transverse part 24 which carries laterally spaced guide blocks 26. Front end portion 16 of bar member 12 fits with slight clearance between guide blocks 26 and rests upon transverse part 24. A cover plate 28 is secured by bolts 30 to guide blocks 26 and transverse part 24 overlying front end portion 16 of bar member 12 with slight clearance.

In FIGS. 2 and 3, hitch 10 is shown connected to a towing vehicle 32. Attachment plate 20 of the hitch is bolted or otherwise secured to the lower edge portion of bumper 34 of the towing vehicle. Transverse part 24 of attachment bracket 22 is secured to the frame 36 of the towing vehicle forwardly of bumper 34. Rear end portion 14 of bar member 12 extends rearwardly of bumper 34 so as to expose hitch ball 14 for attachment to a towed vehicle. Bumper 34 of towing vehicle 32 is of the energy or shock absorbing type and is shiftable upon impact between the solid and broken line positions illustrated in FIG. 3 relative to frame 36. As bumper 34 shifts from its solid line position into its broken line position, bar member 12 of hitch 10, including hitch ball 18, will also shift forwardly relative to the towing vehicle, as illustrated by broken lines 37 in FIG. 3, with the front end portion 16 of bar member 12 sliding longitudinally between guide blocks 26 and over transverse part 24 of attachment bracket 22. Appreciable vertical and lateral displacement of front end portion 16 of hitch bar member 12 relative to frame 34 is prevented by the bar member confining relationship of transverse part 24, guide blocks 26 and cover plate 28 of attachment bracket 22.

In some constructions of the hitch of this invention, rubber or another type frictional material may be utilized in the construction of attachment bracket 22 to contact front end portion 16 of bar member 12, thereby providing resistance to the freedom of longitudinal movement of the bar member relative to the towing vehicle frame upon bumper impact. When such a frictional material is used, attachment bracket 22 and bar member 12 can form an integral part of the shock or energy absorbing bumper. Additionally, front end portion 16 of bar member 12 may be elastically connected to attachment bracket 22 by means of a rubber or other type elastic material so as to regulate the degree of freedom of longitudinal movement of the bar member relative to the towing vehicle frame. It is to be further understood that the configuration of bar member 12, attachment bracket 22 and attachment plate 20 can vary, depending upon the construction and design of the towing vehicle.

It is to be understood that the invention is not to be limited to the details above given but may be modified within the scope of the appended claims.

What I claim is:

1. A hitch mountable to a bumper, said bumper constituting a part of a towing vehicle having a frame, said bumper being of the shock absorbing type and shiftable relative to said frame, said hitch comprising a rigid bar member extending longitudinally of said vehicle and having front and rear end portions, the rear end portion of said bar member carrying means for releasably connecting a towed vehicle to said bar member, means rigidly securing said bar member to said bumper adjacent its said rear end portion wherein said bar member is shiftable with said bumper relative to said vehicle, and an attachment bracket secured to said frame forwardly of said bumper, said bracket including means receiving in sliding cooperation the forward end portion of said bar member, said bracket means permitting longitudinal movement of said bar member relative to said bracket while restricting lateral movement of said bar member relative to the bracket.

2. The hitch of claim 1 wherein said bracket means supports said bar member at its said forward end portion.

3. The hitch of claim 2 wherein said bracket means serves as a guide and receives the forward end portion of said bar member in sliding cooperation.

4. The hitch of claim 2 wherein said means for rigidly securing said bar member to said bumper includes a transverse member fixed to said bar member and extending transversely thereof, said transverse member connected to said bumper.

5. The hitch of claim 2 wherein said means for releasably connecting said bar member to a towed vehicle includes a hitch ball.

* * * * *